July 18, 1933.  J. A. SCHMITT  1,919,172
MILKING APPARATUS
Filed Aug. 24, 1927
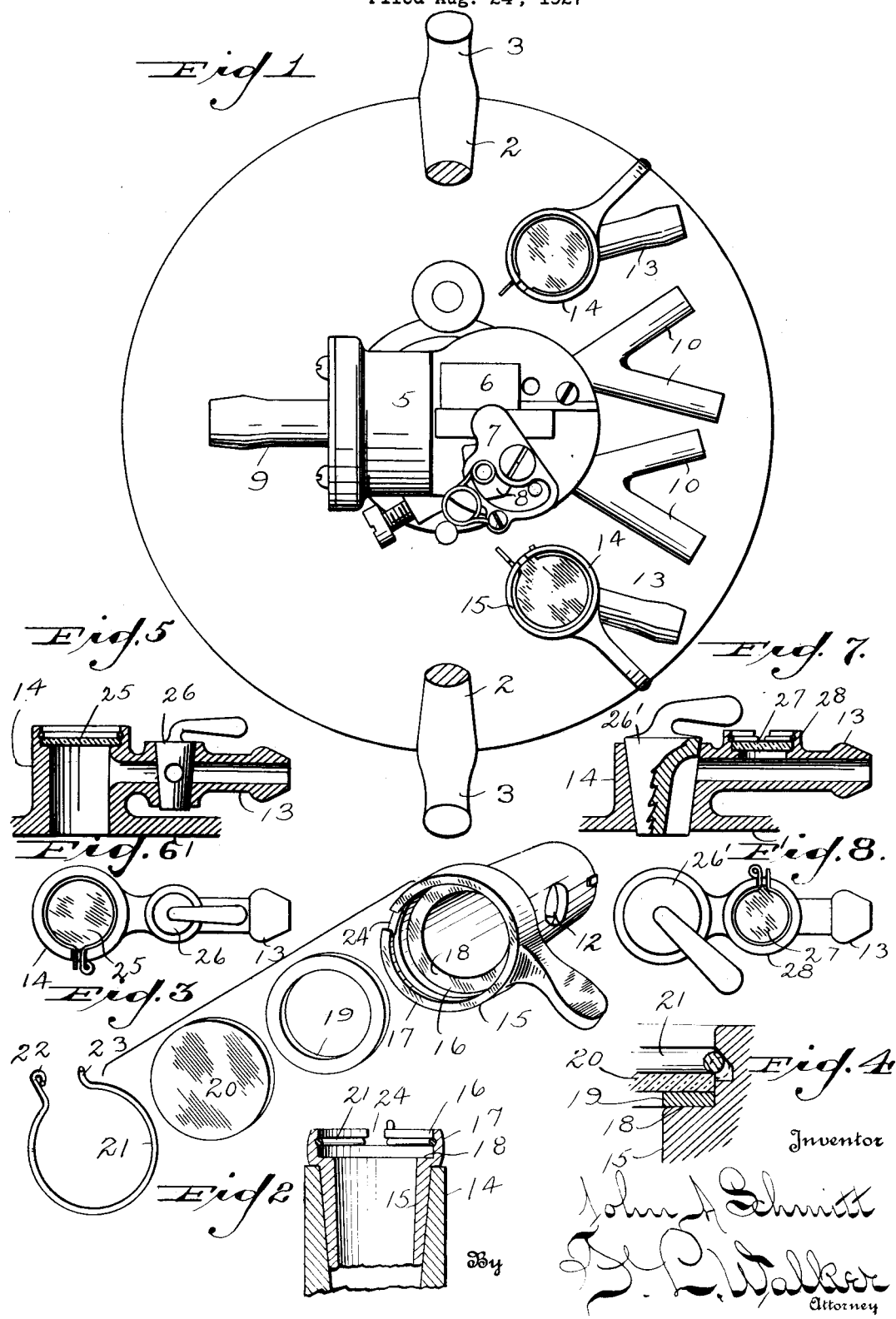

Patented July 18, 1933

1,919,172

UNITED STATES PATENT OFFICE

JOHN A. SCHMITT, OF WAUKESHA, WISCONSIN, ASSIGNOR TO THE UNIVERSAL MILKING MACHINE COMPANY, OF WAUKESHA, WISCONSIN, A CORPORATION OF WISCONSIN

MILKING APPARATUS

Application filed August 24, 1927. Serial No. 215,243.

My invention relates to milking apparatus, and more particularly to improved connections between the teat cups and the milk receiver, having therein observation apertures through which the flow of milk may be readily observed.

In the present construction there is contemplated an inlet connection to the milk receiver or pail, having therein a removable transparent observation window of flat character. This window is preferably though not necessarily located in the upper end of an adjustable cut-off valve. In such case the revoluble plug of the valve is of tubular form having in its upper or outer end a seat or internal rabbet to receive a gasket on which rests a glass disc held in place by an expansible clamp ring which enables the parts to be readily disassembled for cleansing. In lieu of mounting the observation disc or window directly in the revoluble plug of the valve, it may be mounted in the spud or connection for the milk tube leading from the teat cup adjacent to such cut-off valve.

The object of the invention is to simplify the structure, as well as the means and mode of operation of such observation devices or indicators for enabling the flow of milk to be observed, whereby they will not only be conveniently located, and easily accessible for observation, but will be capable of being easily and quickly disassembled for cleansing and will be secure and tight when assembled to prevent the admission of air and will be efficient, durable and unlikely to get out of repair.

A further object of the invention is to provide such indicator or observation window employing a flat transparent disc, and to provide in conjunction therewith means for yieldingly holding such disc tightly upon its seat to insure a hermetically sealed connection.

With the above primary and other incidental objects in view, as will more fully appear in the specification, the invention consists of the features of construction, the parts and combinations thereof, and the mode of operation, or their equivalents, as hereinafter set forth and described in the claims.

Referring to the accompanying drawing, wherein is shown the preferred, but obviously not necessarily the only form of embodiment of the invention, Fig. 1 is a top plan view of a milk receiver showing the usual pulsator located thereon and contiguous thereto the apertured inlet connection forming the subject matter hereof. Fig. 2 is a detail sectional view of the apertured valve with the observation disc and sealing gasket removed. Fig. 3 is a perspective view of the several elements disassembled from each other, but arranged in the order of their assembly. Fig. 4 is an enlarged detail view of the pressure joint between the observation glass and its mounting. Fig. 5 is a sectional view of a modification of which Fig. 6 is a top plan view. Fig. 7 is a similar sectional view of a further modification of which Fig. 8 is a top plan view.

Like parts are indicated by similar characters of reference throughout the several views.

Referring to the accompanying drawing wherein is shown the preferred forms of embodiment of the invention, 1 is the top of a milk pail or receiver provided with the usual bail or handle 2, which in the present instance has been shown broken away. This handle 2 is provided with hooks 3 for conveniently supporting the teat cup clusters when not in use. Mounted centrally upon the lid or cover 1 is the pulsator mechanism of the type shown and described in my co-pending application Serial No. 505,257 since matured into Letters Patent No. 1,647,971 dated Nov. 1, 1927 of which the present application is a continuation in part. Briefly stated, this pulsator mechanism comprises a cylinder 5 in which is located a reciprocatory piston operatively connected with the reciprocatory pulsator valve 6 and with an operating actuator 7 governing a control valve 8 by which air and atmospheric pressure is admitted to the cylinder 5 first at one side and then at the other of the enclosed piston. The cylinder 5 is connected by the control valve with an exhaust conduit 9, which is connected with a suitable pump or suction apparatus. This conduit 9 also communicates with the spuds or connections 10—10 which lead to the teat cup clusters and which are controlled by the pulsator valve 6. This pulsator mechanism forms no part of the present invention, but is here described to facilitate an understanding of the purpose and function of the milk tube connection and observation window forming the subject matter hereof.

It is quite desirable during the period of operation to observe the flow of milk through the milk tubes, from the respective clusters. By this means the operator is enabled to judge the condition of the cow and know when she has been completely stripped. It is quite the usual practice to provide a glass tube in the milk conduit, but such tube tends to obstruct the milk flow and is difficult to keep clean and tends to collect milk intermediate the tube and rubber. In the present construction there is provided an observation window, removed from direct contact by the milk or proximity to the flow. It is usual to provide milk valves or cutoffs in the lid or pail cover 1 at the point of entrance of milk tubes thereto. These cutoffs are usually a tapered oscillatory plug or valve member, seated in a corresponding opening with which the milk tube communicates. By turning such valve members to and fro, the milk conduit is opened and closed.

In the present instance, the lid 1 is provided with the usual bosses 14 with which the milk conduit spuds 13 communicate. These bosses are provided with tapered or conical bores, in which are seated the valve members 15. These valve members are tapered to correspond to the bores of the bosses 14 and are formed hollow or tubular with a lateral port or recess 12, adapted when the valve member is turned to proper position to communicate with the milk conduit spud 13. The tops of the valve members 15 are counter bored as at 16, the margin of such counter bore being inturned or internally flanged as at 17. Seated within this counter bore upon the shoulder 18 formed thereby, is first a rubber gasket or packing member 19, on which is seated a glass or other transparent disc 20. The disc 20 is retained in position by a split ring 21 of wire or other resilient material, having the out-turned ends 22 and 23. One side of the counterbored portion of the valve member is formed with the undercut notch 24, in which the ends 22 and 23 of the ring 21 engage. The expansion of the ring 21 beneath the inturned flange 17 detachably retains the observation glass 20 in place. The end 23 of the ring 21 protrudes sufficiently to permit its easy engagement by the fingers of the operator, whereby the ring may be flexed or contracted to disengage it from beneath the overhanging flange or margin, thereby permitting ready removal of the glass for cleansing.

The inturned flange 17 is preferably beveled on its under side as at 18 to receive the spring ring 21, which by its camming action thereon tends to exert a constant clamping pressure upon the sight glass 20.

In Fig. 5 there is shown a modification of the milk valve and observation window, where in lieu of the combined window and milk valve shown in Figs. 2 and 4, and also in Fig. 1, these elements have been shown independently. The milk valve of ordinary type is shown at 26 in the spud 13, while the boss 14 is provided with a window or observation space 25 in the top thereof. In Figs. 7 and 8 this relation of independent milk valve and observation window has been reversed. In these figures the milk valve is shown at 26' seated in the boss 14 in the usual manner. A window observation space 27 is located in an enlargement 28 of the spud 13 in close relation to the boss 14. In both these modified constructions the transparent window disc 25 and 27 is retained in position by the means as illustrated in Figs. 2 and 4. This consists of the split wire ring 21 which is engaged under an overhanging flange 17 with the ends of a split ring in an undercut notch 24 before described.

In practice it has been found that while the out turned end 22 of the retaining ring is convenient for disengaging the ring to permit disassembly of the parts it is not essential and the out turned ends 22 and 23 may be omitted as may also the notch 24. The split ring is easily sprung into place, and may be easily removed by a slight prying action. When in place it maintains the observation glass under pressure to insure a tight joint, yet affords a quick detachable connection. This is highly desirable since a saving of time is an important factor in dairy operation. The construction involves easily cleaned parts having no small crevices and screw threads in which milk will collect and from which it is difficult to thoroughly remove. Observation glasses have been before used, wherein the glass is secured by a screw threaded gland ring, as in patents to Klein 816,583 and 1,024,859 and Buckwalter et al, 1,416,166. However, the unsanitary conditions of such type due to difficulty of thoroughly cleansing the screw threaded parts and the liability to breakage of the glass by screwing the gland ring too tightly and the loss of time in applying and removing the glass and ring are overcome by the present spring ring quick detachably retaining means.

From the above description it will be apparent that there is thus provided a device of the character described, possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An inlet connection for a milk receiver, or the like, having therein a rabbeted seat for a flat transparent observation plate, a transparent plate engageable therewith, the peripheral shoulder of said seat having an inwardly tapered groove therein and having an inwardly divergent notch in one side thereof, a split ring engageable with the tapered surface of the groove in the peripheral shoulder with which it has camming action to exert pressure on the transparent plate and an outturned extremity on said split ring engageable in said notch.

2. An inlet conduit communicating with a milk receiver, or the like, having therein an enlarged portion provided with a lateral opening, a rabbeted seat formed about said opening, a flat transparent disc engageable with said rabbeted seat, the peripheral portion of said rabbeted seat having therein an inwardly inclined groove, a split spring ring overlying the disc, and yieldingly engaging with the inclined surface of said groove in the upstanding portion of the rabbeted seat and by its camming coaction therewith exerting pressure on said flat transparent disc, said upstanding portion being notched, and the ends of the split ring being out-turned for engagement in said notch.

3. The combination with a cover for a milk receiving vessel and a milk conduit discharging therethrough into the vessel, of a removable valve member revoluble about a vertical axis controlling the milk conduit, said removable valve member having a substantially vertical bore, the inner end of which is open and communicates with the receiver and having a lateral orifice communicating with the substantially vertical bore movable into and out of registry with the milk conduit to open and close said conduit; a removable transparent cover disc removably mounted upon the upper end of the valve through which the flow of milk may be observed, and a retaining ring detachably engaging the valve member and overhanging the margin of the disc.

4. The combination with a cover for a milk receiving vessel and a valved milk conduit discharging therethrough into the vessel, having therein an observation opening; a rabbet formed about said opening affording a seat for a transparent plate; a transparent plate seated thereon, the upstanding wall of said rabbet surrounding the seat having therein an inwardly tapered interior groove contiguous to the plane of said transparent plate and an expansible split ring seated within said tapered groove and by its camming action on the tapered surface thereof exerting pressure upon the transparent plate.

5. The combination with a cover for a milk receiving vessel, of a milk conduit discharging through the cover into the receiving vessel; a valve seat; a revoluble tapered plug valve removably mounted in said seat and controlling the conduit, said valve having a passage therethrough moved into and out of communication with the conduit by the rotation of the valve, and a transparent window for said passage detachably mounted upon and removable with the rotary valve plug through which the passage of milk may be observed.

6. The combination with a cover for a milk receiving vessel having a passage leading therethrough into the vessel, of a removable cut-off valve member for said passage having an observation opening in the top side of the valve member and above the level of the flowing milk, a transparent closure member for said opening mounted upon and removable with the cut-off valve through which the flow of milk through the valve may be observed vertically below the transparent closure, and a retaining member carried by the valve member for removably retaining the transparent closure member in position.

7. The combination with a cover for a milk receiving vessel having a passage leading therethrough into the vessel, of a removable cut-off valve for said passage having an observation opening located therein in a plane above the level of the flowing milk through which such flow past the valve may be observed, a transparent closure for said observation opening carried by and removable with the cut-off valve, and a detachable retainer member for the transparent closure.

JOHN A. SCHMITT.